US010687280B2

(12) United States Patent  
Singh et al.

(10) Patent No.: US 10,687,280 B2  
(45) Date of Patent: Jun. 16, 2020

(54) LOW BATTERY INDICATION IN WI-FI ENABLED DEVICE OR SENSOR

(71) Applicant: Ademco Inc., Golden Valley, MN (US)

(72) Inventors: Anand Kumar Singh, Bangalore (IN); Antony Baskar Arul, Tamil Nadu (IN)

(73) Assignee: Ademco Inc., Golden Valley, MN (US)

( * ) Notice: Subject to any disclaimer, the term of this patent is extended or adjusted under 35 U.S.C. 154(b) by 40 days.

(21) Appl. No.: 15/255,300

(22) Filed: Sep. 2, 2016

(65) Prior Publication Data

US 2018/0070311 A1    Mar. 8, 2018

(51) Int. Cl.  
*H04W 52/02*    (2009.01)

(52) U.S. Cl.  
CPC ... *H04W 52/0225* (2013.01); *H04W 52/0212* (2013.01); *H04W 52/0261* (2013.01); *Y02D 70/00* (2018.01); *Y02D 70/10* (2018.01); *Y02D 70/14* (2018.01); *Y02D 70/142* (2018.01); *Y02D 70/144* (2018.01); *Y02D 70/20* (2018.01); *Y02D 70/26* (2018.01)

(58) Field of Classification Search  
CPC ..................... H04W 52/0225; H04W 52/0212  
USPC ........................................................ 370/311  
See application file for complete search history.

(56) References Cited

U.S. PATENT DOCUMENTS

| 5,241,542 A | 8/1993 | Natarajan et al. |
| 7,840,679 B2 | 11/2010 | Zuckerman et al. |
| 8,559,369 B2 | 10/2013 | Barkan |
| 9,276,740 B2 | 3/2016 | Nix |
| 9,361,630 B1 * | 6/2016 | Goswami ........... G06Q 30/0267 |
| 9,961,523 B1 * | 5/2018 | Daoura ................. H04W 4/185 |
| 2016/0157177 A1 | 6/2016 | Knowles |
| 2016/0234778 A1 | 8/2016 | Gaja et al. |
| 2016/0234786 A1 * | 8/2016 | Gaja ................. H04W 52/0261 |
| 2017/0188326 A1 * | 6/2017 | Jeon ....................... H04W 64/00 |

OTHER PUBLICATIONS

"European Application Serial No. 17187907.5, Extended European Search Report dated Jan. 18, 2018", 9 pgs.
Response to Extended Search Report dated Jan. 18, 2018, from counterpart European Application No. 17187907.5, filed Aug. 31, 2018, 40 pp.
Intent to Grant Communication from corresponding EP Application No. 17187907.5 dated Apr. 29, 2019.

* cited by examiner

*Primary Examiner* — Peter G Solinsky  
(74) *Attorney, Agent, or Firm* — Shumaker & Sieffert, P.A.

(57) ABSTRACT

A system of saving battery power in a battery powered Wi-Fi device. The system includes a battery powered Wi-Fi device configured to transmit a customized beacon frame from the battery powered Wi-Fi device to a Wi-Fi enabled device. The customized beacon frame includes battery status information. In another form, a method of saving battery power in a battery powered Wi-Fi device. The method includes transmitting a customized beacon frame from the battery powered Wi-Fi device to a Wi-Fi enabled device. The customized beacon frame includes battery status information. In another form, a system for saving sensor battery power includes a battery powered sensor configured to transmit a customized beacon frame from the battery powered sensor to a Wi-Fi enabled device. The customized beacon frame includes sensor data. Customized beacon frame may be sent from the Wi-Fi enabled device to a wireless network.

6 Claims, 10 Drawing Sheets

Beacon Frame Body for Battery Status

Beacon Frame Body for Battery Status

Beacon Frame Body for Sensor Data
Fig. 9

Fig. 10

LOW BATTERY INDICATION IN WI-FI ENABLED DEVICE OR SENSOR

BACKGROUND

Wi-Fi devices are typically utilized to wirelessly send and/or receive signals between the Wi-Fi devices. One of the important factors associated with using battery-powered Wi-Fi devices is to maintain sufficient battery power for adequate operation of the battery powered Wi-Fi devices.

Many conventional Wi-Fi devices are required to periodically send out an IP based health packet to a remote server through an existing Wi-Fi infrastructure that is made up of various Wi-Fi devices that form a wireless network. A typical health packet contains information about the existing battery level status for the Wi-Fi device(s).

The battery level status is ordinarily communicated to an end user via a remote server or a client side end device. The end user monitors the remote server or client side end device which receives the IP based health packets.

These IP based health packets provide the user with information about the battery status of battery powered Wi-Fi devices. When the indicated battery level is below a low battery threshold limit, a user may take appropriate action to change (or compensate) for a low battery situation in battery powered Wi-Fi devices.

There is a drawback associated with using periodic transmission of IP based health packets to monitor the battery level status for the battery powered Wi-Fi device(s). Specifically, the drawback is that sending IP based health packets through an existing network of Wi-Fi devices undesirably consumes stored charge in the batteries of the battery powered Wi-Fi devices. This overall power consumption that is associated with sending periodic IP based health packets thus shortens the overall operating battery life of battery powered Wi-Fi devices.

Figure 1:
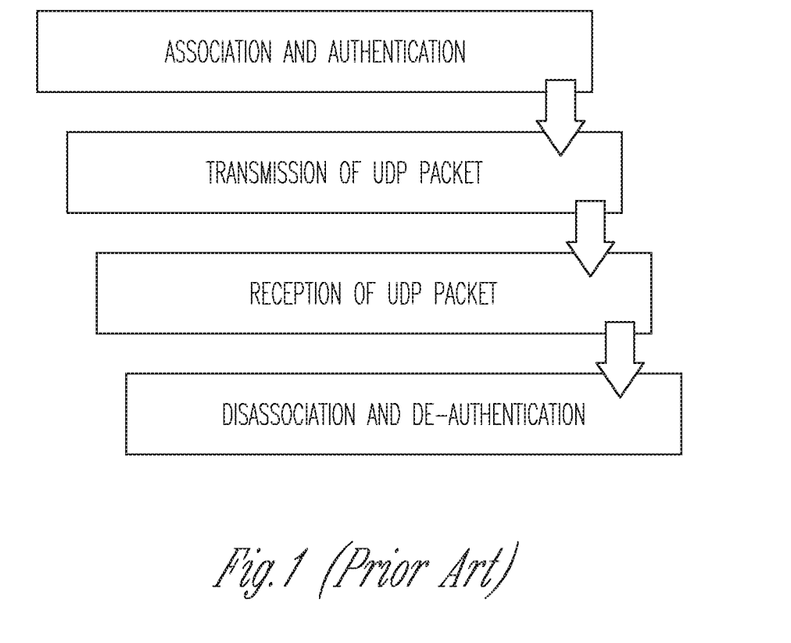
FIG. 1 illustrates a prior art process for IP based packet transmission that is done solely for sending battery status information of a battery powered Wi-Fi Device.

Conventional approaches for updating battery status through IP based packet transmission typically involve various stages that directly impact current consumption within the battery powered Wi-Fi Devices. FIG. 1 illustrates one conventional process for IP based packet transmission that is done solely for sending information about the battery level of a battery powered Wi-Fi Device.

In a typical Wi-Fi based infrastructure an IP based packet transmission involves a battery powered Wi-Fi station device to associate/authenticate to an external Wi-Fi Access Point; transmission of an IP based packet; reception of an IP based packet acknowledgement; and disassociate/de-authenticate with the external Wi-Fi Access Point. Each of these steps undesirably consumes battery power from the battery in battery powered Wi-Fi devices.

SUMMARY

A system of saving battery power in a battery powered Wi-Fi device. The system includes a battery powered Wi-Fi device configured to transmit a customized beacon frame from the battery powered Wi-Fi device to a Wi-Fi enabled device. The customized beacon frame includes battery status information.

In another form, a method of saving battery power in a battery powered Wi-Fi device. The method includes transmitting a customized beacon frame from the battery powered Wi-Fi device to a Wi-Fi enabled device. The customized beacon frame includes battery status information.

In another form, a system for saving sensor battery power. The system includes a battery powered sensor configured to transmit a customized beacon frame from the battery powered sensor to a Wi-Fi enabled receiver. The customized beacon frame includes sensor data.

In another form, a method of saving battery power in a battery powered sensor. The method includes transmitting a customized beacon frame from the battery powered sensor to a Wi-Fi enabled device. The customized beacon frame includes sensor data.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the embedded claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The system and method described herein may eliminate the periodic transmission of IP based Health packets that are conventionally used to update the battery level status in conventional wireless networks that utilize Wi-Fi devices. Minimizing (or eliminating) IP based health packet transmissions within a wireless network may reduce the overall current consumption of the battery powered Wi-Fi devices that form the wireless network. Since the overall current consumption of the Wi-Fi devices may be reduced, the overall battery life of the Wi-Fi devices may be extended.

In some forms, battery powered Wi-Fi devices publish (sometimes continuously) customized beacon frames. As used herein, a customized beacon frame may refer to the additional bytes added in the vendor information element of a Wi-Fi management beacon frame which enables only the specific vendor to interpret these bytes as per his own proprietary defined values.

As an example, the beacon frames may be one of the management frames of an 802.11 Beacon. In some forms, the customized beacon frames may be transmitted periodically to announce the presence of a battery powered Wi-Fi device.

Usually Wi-Fi standard beacon frames mainly comprise a MAC (media access control header); a frame body; and FCS (frame check sequence). Some of the fields that may be included in the frame body of the beacon frame include:

1. Time stamp
2. Beacon interval
3. Capability Information
4. Service Set Identifier (SSID)
5. Supported rates
6. Parameters Set
7. Transmitted Indication Map (TIM)
8. Vendor Specific Information Element Field As used herein, a frame body may be part of an IEEE 802.11 WLAN (wireless local area network) management beacon frame. These customized beacon frames may be transmitted periodically to announce the presence of a wireless LAN. As an example, these frame bodies may contain information about the wireless medium that is operated according to various parameters (e.g., channel information, data rate capability and/or SSID (service set identifier)).

802.11 standards have a provision to carry nonstandard, vendor-specific, information in the "vendor specific" Information Element (IE) field of beacon frame. This "vendor specific" Information Element (IE) field may include up to 253 octets of information that may be embedded in each customized Beacon frame.

The systems and methods described herein include battery level values in the "vendor specific" Information Element in the customized beacon frames transmitted by the respective battery powered Wi-Fi devices thereby enabling other Wi-Fi devices (or a remote servers) in the wireless network to receive battery level status. Therefore, the systems and methods may transmit battery information to a remote server from any of the battery powered Wi-Fi devices that form the wireless network.

Using customized beacon frames to transmit battery status information to a remote server avoids the need for an additional association, authentication and an IP based packet transmission to the existing wireless infrastructure in order to provide updated battery status to a remote server. Since the additional IP based packet transmission is no longer required, the battery power that would otherwise be required to send the additional IP based packet transmission is desirably saved.

Figure 2:
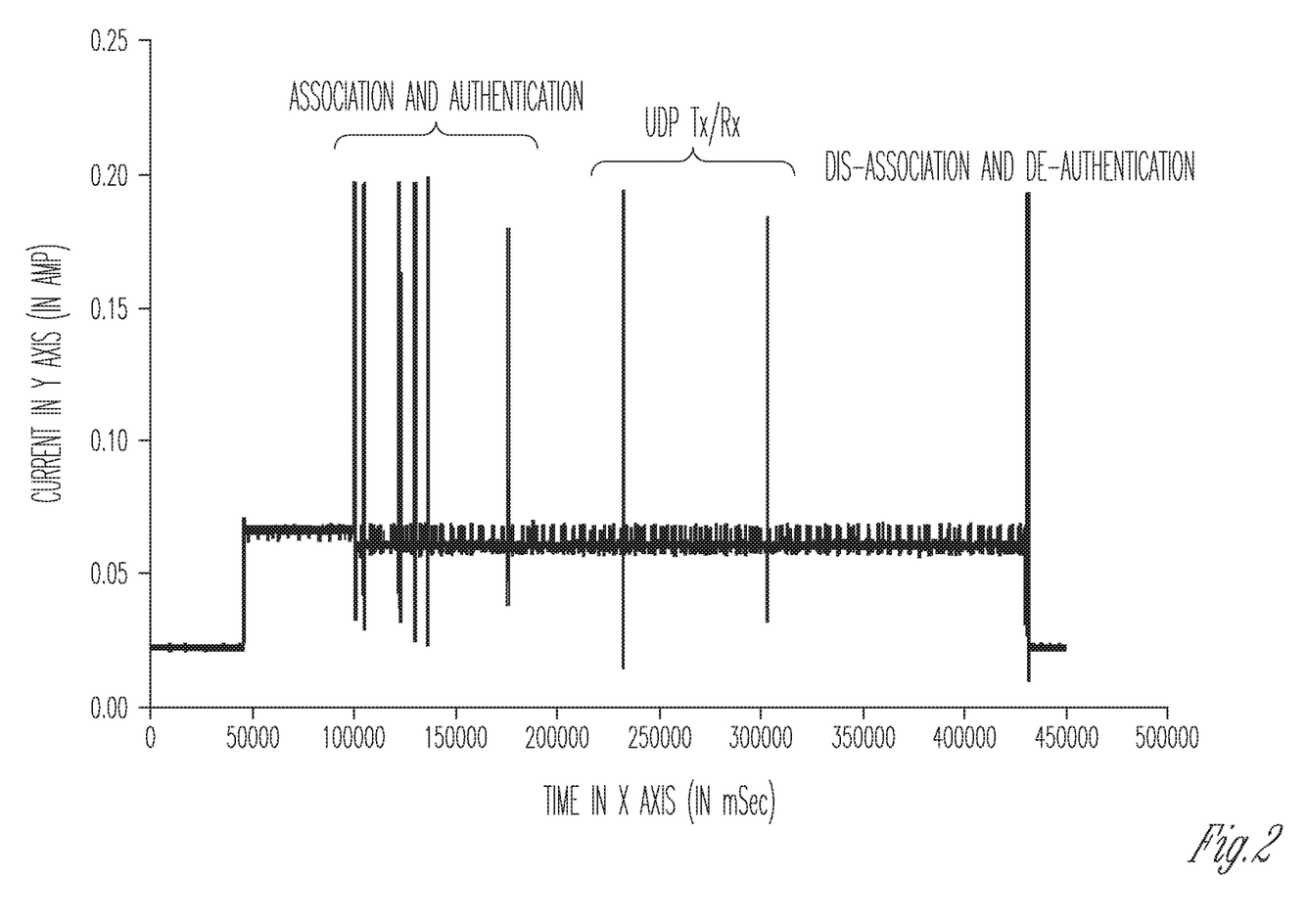
FIG. 2 shows the average current consumption that is typically involved in a conventional process of transmitting an IP based packet to a Wi-Fi network.

As shown in FIG. 2, adding battery status information [BSI] to a customized beacon frame 1 before transmitting a customized beacon frame 1 from the Wi-Fi device to a wireless network N may eliminate the current consumption (e.g., 50 to 60 mA average current for 4 to 6 sec.) that is typically involved in a conventional process of transmitting an IP packet to a wireless network. By eliminating this current consumption, the battery life of the battery powered Wi-Fi device may be increased.

Figure 3:
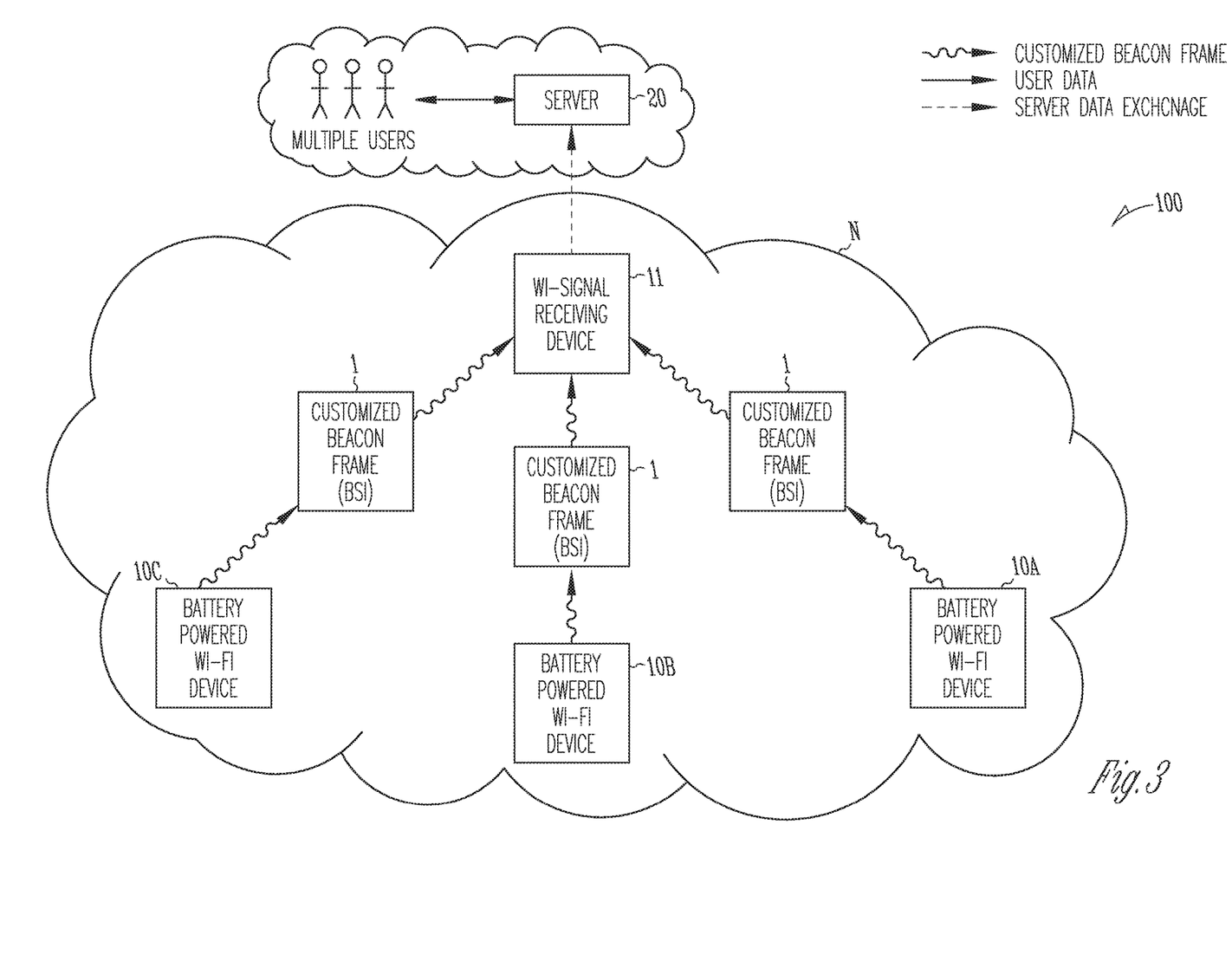
FIG. 3 illustrates a system and method of saving battery power in a battery powered Wi-Fi device.

A system 100 and method of saving battery power in a battery powered Wi-Fi device 10A, will now he described relative to FIG. 3. The system 100 includes a battery powered Wi-Fi device 10A. The battery powered Wi-Fi device 10A is configured to transmit a customized beacon frame 1 from the Wi-Fi device 10A to a Wi-Fi enabled device 11 (that may include one or more various types of receivers) The customized beacon frame 1 includes battery status information [BSI].

As shown in FIG. 3, the system 100 may further include a remote server 20 that forms at least part of the wireless network N with the Wi-Fi device 10A. The customized beacon frame 1 may he transmitted directly (or indirectly) from the Wi-Fi device 10A to the Wi-Fi enabled device 11 (that may include one or more various types of receivers).

In some forms, the system 100 may also (or alternatively) include at least one additional Wi-Fi device (see, e.g., Wi-Fi devices 10B & 10C) that forms at least part of the wireless network N with the Wi-Fi device 10A. As an example, the respective customized beacon frames 1 may be transmitted to a Wi-Fi signal receiving device 11 that is connected to the server 20. The server 20 and the Wi-Fi enabled device 11 may be hardwired together or wirelessly connected. It should be noted that the manner in which the customized beacon frame 1 is transmitted throughout the wireless network N will depend in part on the physical location of the various Wi-Fi devices and servers in the wireless network N as well as the types of Wi-Fi devices and servers that are included in the wireless network N (among other factors).

A method of saving battery power in a battery powered Wi-Fi device 10A will now be described with reference to FIG. 3. The method includes transmitting a customized beacon frame 1 from the Wi-Fi device 10A to a Wi-Fi enabled device 11. The customized beacon frame 1 includes battery status information.

Transmitting a customized beacon frame 1 from the Wi-Fi device 10A may include transmitting (e.g., via a Wi-Fi signal receiving device 11) the customized beacon frame 1 to Wi-Fi enabled device 11 that is connected to a network N. The manner in which the customized beacon frame 1 is transmitted throughout the wireless network N will depend in part on the physical location of the various Wi-Fi devices and servers in the wireless network N as well as the types of Wi-Fi devices and servers that are included in the wireless network N (among other factors).

As discussed above, transmitting a customized beacon frame 1 may include transmitting the battery status information [BSI] in a frame body of the customized beacon frame 1. In addition, transmitting the battery status information [BSI] in a frame body of the customized beacon frame 1 may include appending extra bytes of battery status information [BSI] to the frame body of the customized beacon frame 1.

As an example, the battery status information [BSI] in the frame body may include an extra seven bytes of battery status information embedded to the frame body. In one preferred form, the extra seven bytes of battery status information that is embedded to the frame body includes battery status information in a Vendor Specific information Element Field of the customized beacon frame 1.

Figure 4:
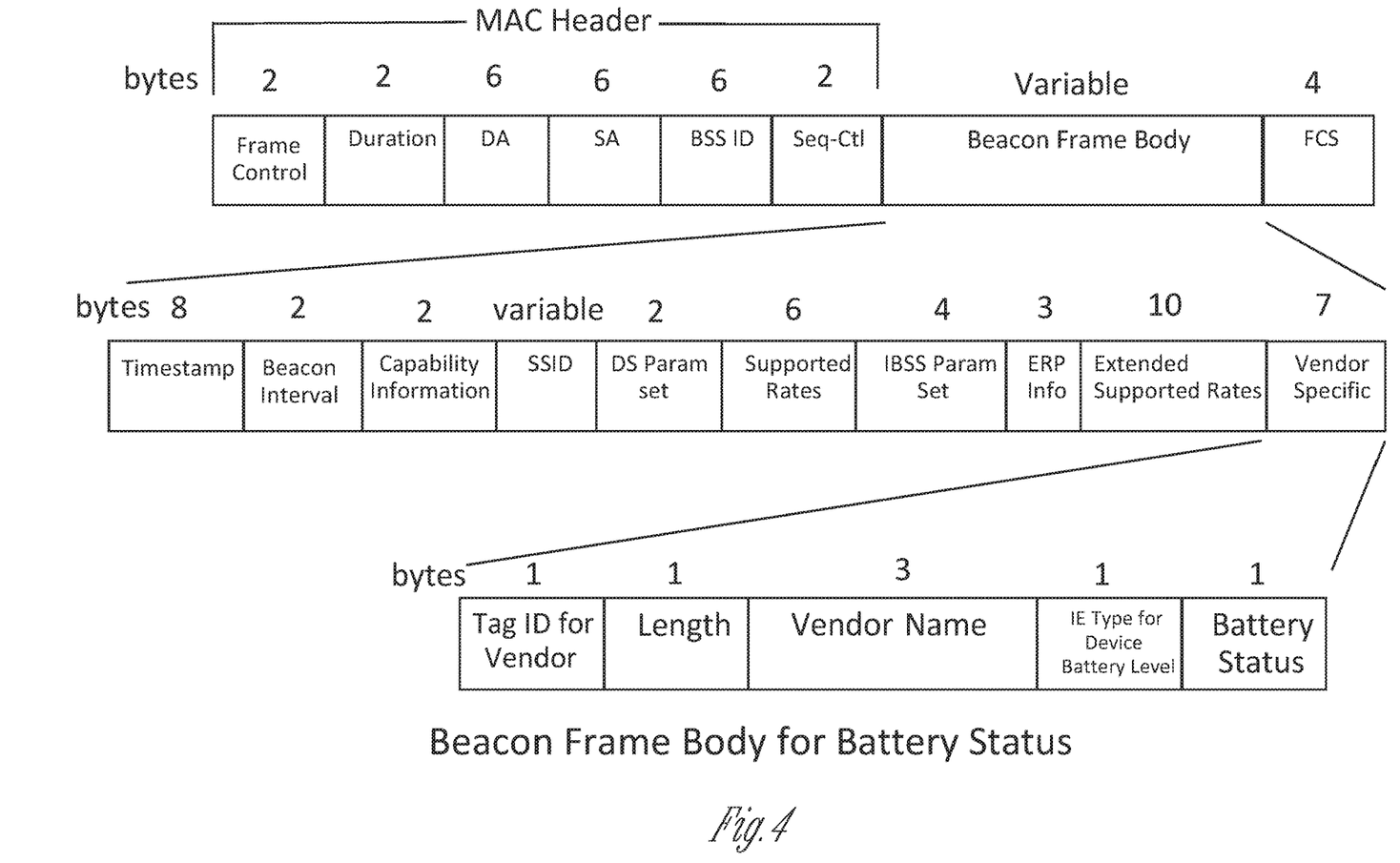
FIG. 4 is an example format for a customized beacon frame that may be used in the system and method described herein.

An example format for a customized beacon frame 1 is shown in FIG. 4. As described above, the method may include appending an extra seven bytes of Vendor Specific information to a frame body of a customized beacon frame 1.

The Vendor Specific Information Field may include information about the existing Battery level status. As an example, the existing battery level may be either a "Normal Battery" or "Low Battery". Table 1 below provides example details of Vendor Specific Information Field relative to a battery powered Wi-Fi device (e.g., Wi-Fi device 10A in FIG. 3).

TABLE 1

| Byte order | Value (hex) | Description |
|---|---|---|
| 1 | 0xDD | Tag ID for Vendor Specific data |
| 2 | 0x05 | Length |
| 3-5 | 0x00037F | Vendor Name |
| 6 | 0x54 | IE type for device battery level |
| 7 | 0x00 | Normal Battery |
|  | 0x01 | Low Battery |

Figure 5:
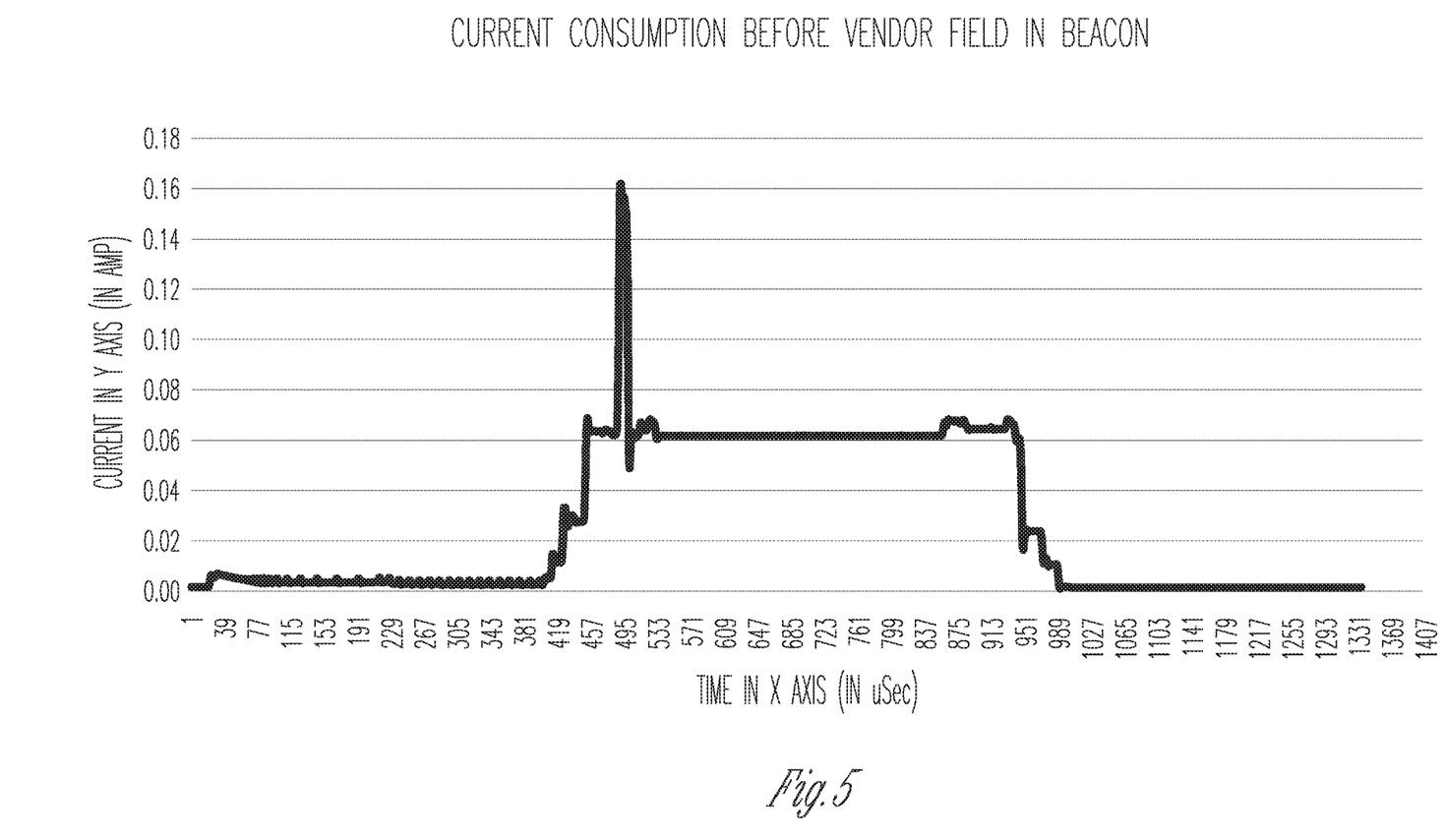
FIG. 5 shows the average current profile of a beacon transmission before adding battery status information to the Vendor Specific Information Field of a customized beacon frame 1.
Figure 6:
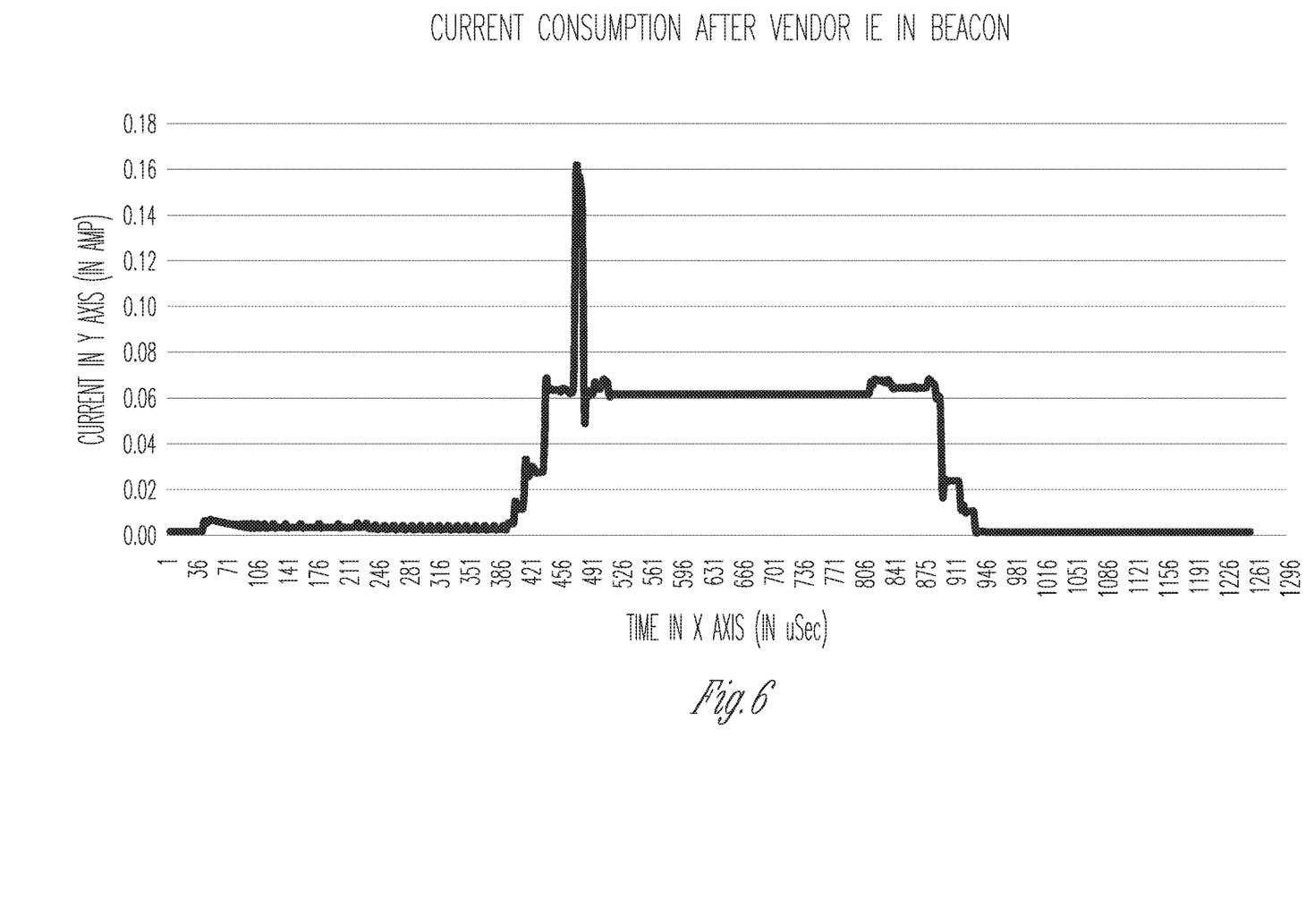
FIG. 6 shows the average current profile of a beacon transmission after adding battery status information to the Vendor Specific Information Field of a customized beacon frame.
Figure 7:
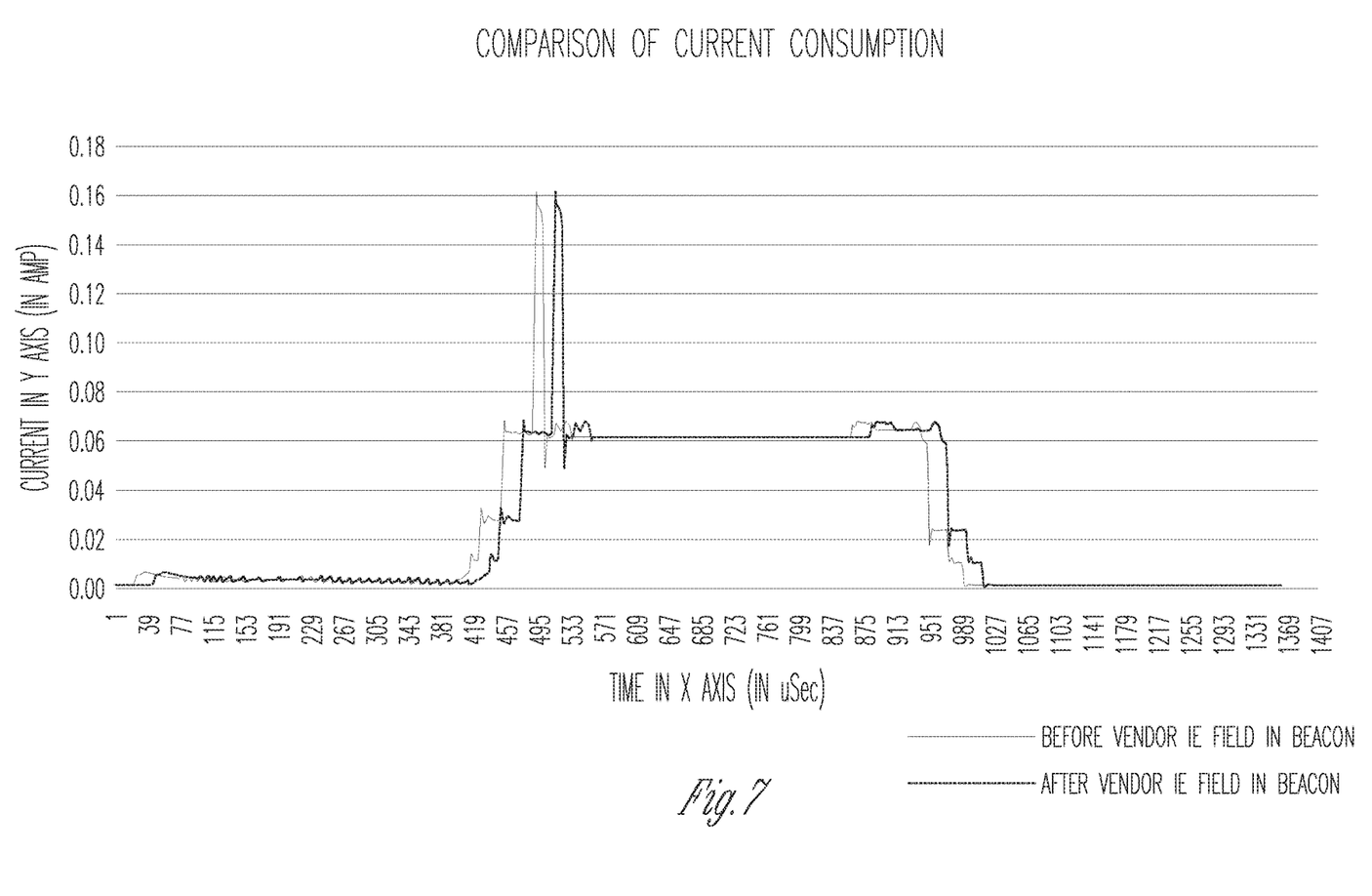
FIG. 7 shows a comparison of the average current profile of a beacon transmission before and after adding battery status information to the Vendor Specific Information Field of a customized beacon frame.

As shown in FIGS. 5-7, the addition of 7 bytes to the Vendor Specific Information Field in the frame body of a customized beacon frame 1 may not significantly affect the average current consumption for transmitting a customized beacon frame 1 as used in the system 100 and method described herein.

FIG. 5 shows the average current profile of a beacon transmission before adding battery status information to the Vendor Specific Information Field of a customized beacon frame 1. FIG. 6 shows the average current profile of a beacon transmission after adding battery status information to the Vendor Specific Information Field of a customized beacon frame 1.

FIG. 7 shows a comparison of the average current profile of a beacon transmission before and after adding battery status information to the Vendor Specific Information Field of a customized beacon frame 1. As shown in FIG. 7, there is minimal or no change in the beacon frame current consumption after adding an extra seven bytes of battery status information to the Vendor Specific Information Field in a customized beacon frame 1 that is transmitted by a battery powered Wi-Fi device 10A.

As discussed above, 802.11 standards have a provision to carry nonstandard, vendor-specific information in the "vendor specific" Information Element (IE) field of beacon frame. This "vendor specific" Information Element (IE) field may include up to 253 octets of information that may be embedded in each customized Beacon frame.

In some forms, the systems and methods described herein include sensors that are part of a wireless network. The sensors transmit sensor data in the "vendor specific" Information Element of customized beacon frames that are transmitted by the respective sensors thereby enabling a remote server or other sensors in the wireless network to receive sensor data. Therefore, the systems and methods may transmit sensor data to a remote server from any of the battery powered sensors that form the wireless network.

Using customized beacon frames to transmit sensor data to a remote server avoids the need for an additional association, authentication and an IP based packet transmission to the existing wireless infrastructure in order to provide sensor data to a remote server. Since the additional IP based packet transmission is no longer required, the battery power that would otherwise be required for the battery powered sensor to send the additional IP based packet transmission is desirably saved.

Therefore, adding sensor data [SD] to a customized beacon frame before transmitting a customized beacon frame from the sensor to a wireless network may eliminate the current consumption that is typically involved in a conventional process of transmitting an IP packet to a wireless network. By eliminating this current consumption, the battery life of the battery powered sensor may be increased.

A system 200 and method of saving battery power in a battery powered sensor 30A will now be described relative to FIG. 8. The system 200 includes a battery powered sensor 30A. The battery powered sensor 30A is configured to transmit a customized beacon frame 31 from the sensor 30A to a Wi-Fi device 11. The customized beacon frame 31 includes sensor data [SD].

Figure 8:
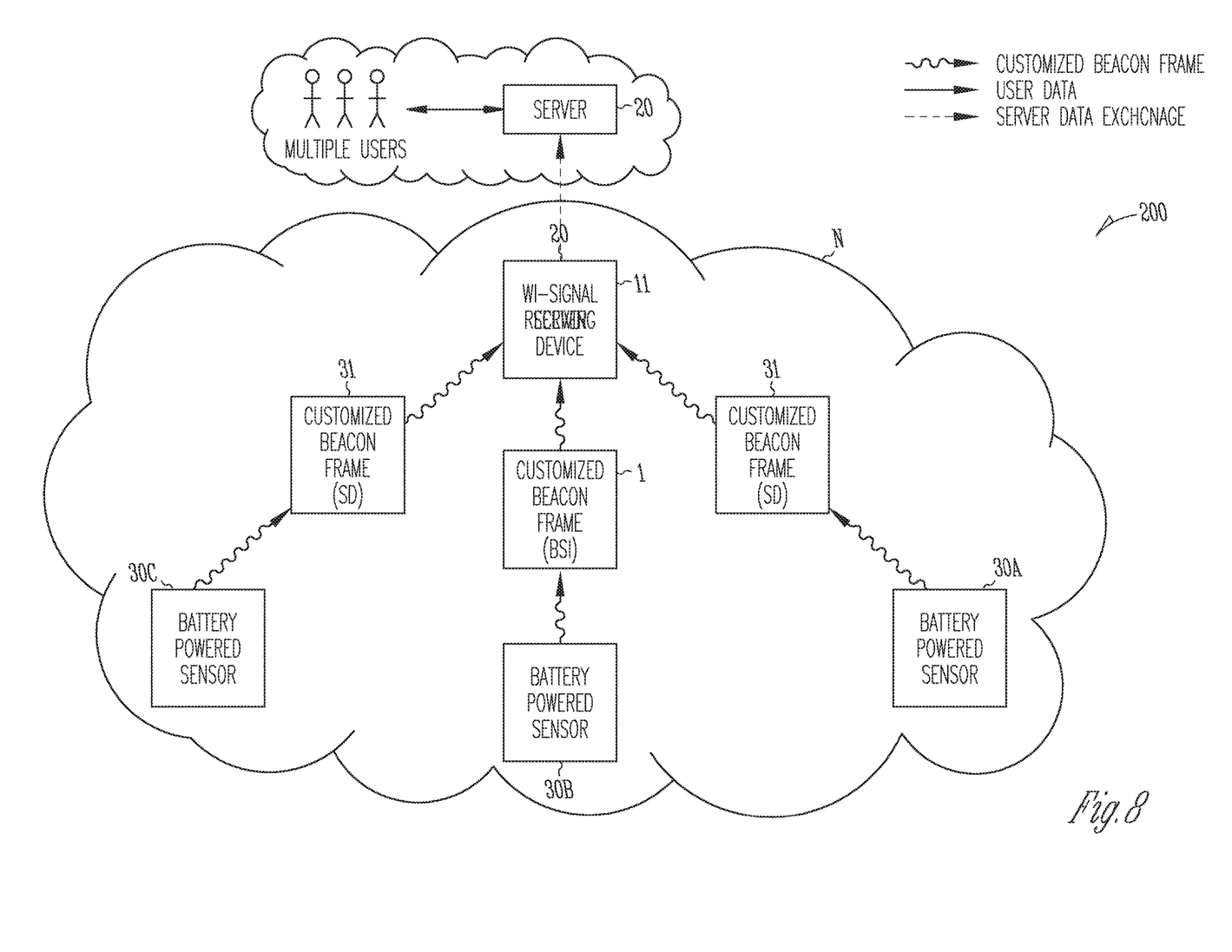
FIG. 8 illustrates a system and method of saving battery power in a battery powered sensor.

As shown in FIG. 8, the system 200 may similarly include remote server 20 that forms at least part of the wireless network N with the battery powered sensor 30A. The customized beacon frame 31 may be transmitted directly (or indirectly (e.g., via a Wi-Fi signal receiving device 11)) from the sensor 30A to the remote server 20.

In some forms, the system 200 may also (or alternatively) include at least one additional sensor (see, e.g., sensors 30B & 30C). It should be noted that the manner in which the customized beacon frame(s) 31 is transmitted throughout the system 200 will depend in part on the physical location of the various sensors and servers in the wireless network N as well as the types of sensors and servers that are included in the wireless network N (among other factors).

As described herein, the sensors 30A, 30B, 30C may include singularly or in combination various types of sensors. As examples, the sensors 30A, 30B, 30C may be pressure, temperature, gas detection, motion detection and humidity sensors (among others). The type of sensors that are included in the system 200 or method described herein will depend in part on the application where the system and method are to be used (among other factors).

A method of saving battery power in a battery powered sensor 30A will now be described with reference to FIG. 8. The method includes transmitting a customized beacon frame 31 from the sensor 30A to a Wi-Fi enabled device 11. The customized beacon frame 31 includes sensor data [SD].

Transmitting a customized beacon frame 31 from the sensor 30A to a Wi-Fi enabled device may include (i) transmitting the customized beacon frame 31 (e.g., via a Wi-Fi signal receiving device 11) to a remote server 20. The manner in which the customized beacon frame 31 is transmitted throughout the system 200 will depend in part on the physical location of the various sensors and servers in the wireless network N as well as the types of sensors and servers that are included in the system 200 (among other factors).

As discussed above, transmitting a customized beacon frame 31 may include transmitting the sensor data [SD] in a frame body of the customized beacon frame 31. In addition, transmitting the sensor data [SD] in a frame body of the customized beacon frame 31 may include appending extra bytes of sensor data [SD] to the frame body of the customized beacon frame 31.

As an example, the sensor data [SD] in the frame body may include an extra seven bytes of sensor data [SD] embedded to the frame body. In one preferred form, the extra seven bytes of sensor data [SD] that is embedded to the frame body includes sensor data [SD] in a Vendor Specific Information Element Field of the customized beacon frame 31.

Figure 9:
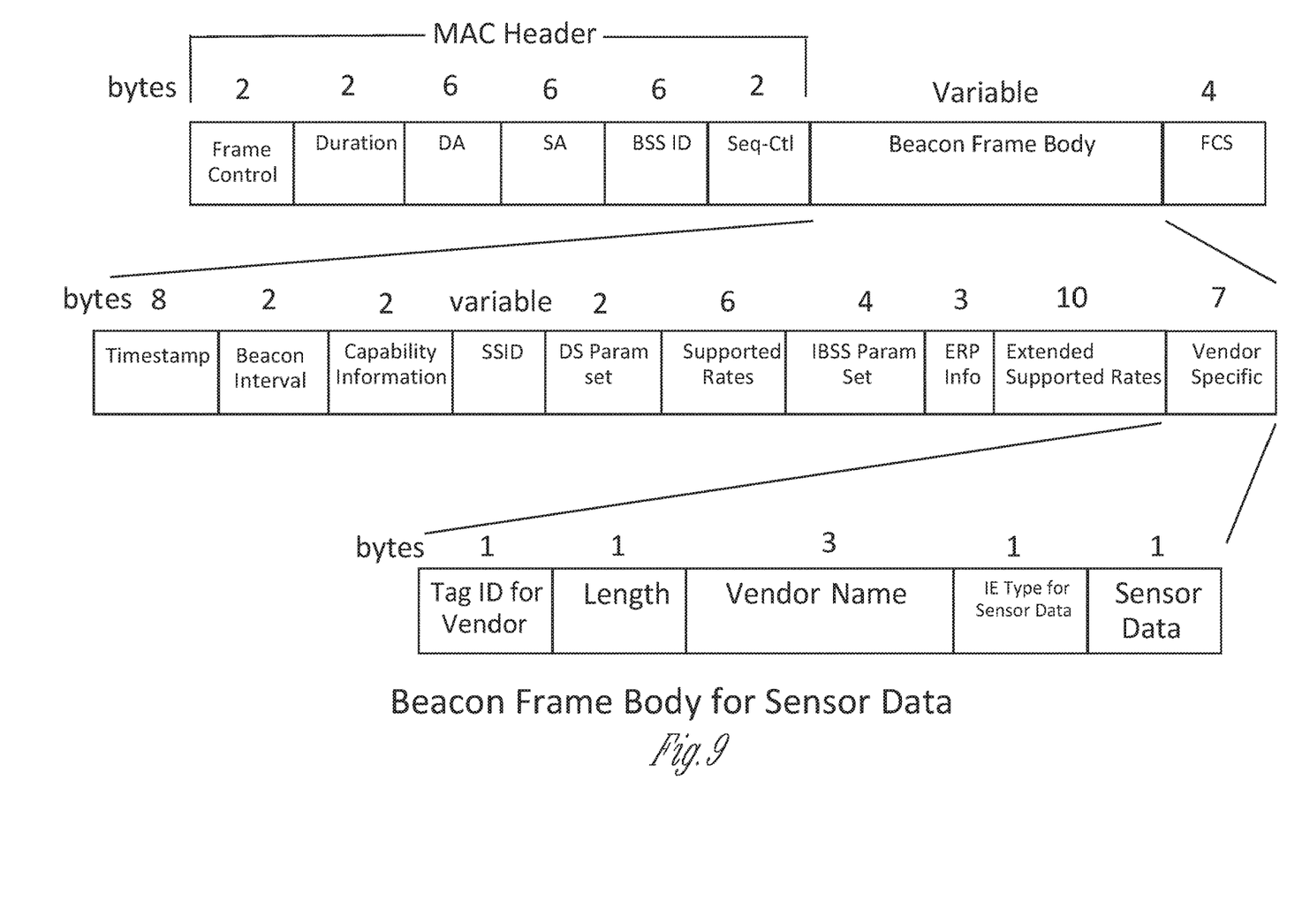
FIG. 9 is an example format for a customized beacon frame that may be used in the system and method described herein.

The format for the customized beacon frame 31 may be similar to the customized beacon frame 1 shown in FIG. 9. However, the method may include appending at least seven extra bytes of sensor data to the Vendor Specific information portion of a frame body.

The vendor specific information may include information about the sensor data. As an example, the sensor data may relate to temperature level or the presence of a particular type of gas (among many other types of sensor applications).

The addition of seven bytes of sensor data into the vendor specific data of the frame body may not significantly affect the average current consumption for transmitting a customized beacon frame 1 as used in the system 200 and method described herein.

Other systems and methods are contemplated that include one or more combinations of any number of battery powered Wi-Fi devices 10A, 10B, 10C and battery powered sensors 30A, 30B, 30C. The number and type of battery powered Wi-Fi enabled devices 11 and/or battery powered sensors 30A, 30B, 30C will depend in part on cost, physical layout, sensing needs and applications where the systems and methods are to be used (among other factors).

In some forms, the systems and methods described herein may include an electronic component (e.g., a Wi-Fi Network Interface Card (hereafter NIC)) that may be configured to passively scan all Wi-Fi RF channels and detect any customized beacon frames coming from the battery powered Wi-Fi devices and/or sensors described herein. An example Wi-Fi Network Interface Card 925 is shown in FIG. 9.

The Vendor Specific Information Field may include information about the sensor data. As examples, the sensor data may relate to temperature, humidity and motion detection (among other types of sensor data). Table 2 below provides example details of Vendor Specific Information Field relative to sensor data (e.g., sensor 30A in FIG. 8).

TABLE 2

| Byte order | Value (hex) | Description |
| --- | --- | --- |
| 1 | 0xDD | Tag ID for Vendor Specific data |
| 2 | 0x05 | Length |
| 3-5 | 0x00037F | Vendor Name |
| 6 | 0x55 | IE type for sensor data |
| 7 | XXX | Sensor data |

It should be noted the other types of information may be included in the vendor information field of the customized beacon frames that are utilized in the systems and methods described herein. The types of information that are included in the vendor information fields of the customized beacon frames will depend in part on the (i) application where the systems and methods described herein are used; and (ii) statuses of the battery powered Wi-Fi devices (e.g., sensors) that used in the systems and methods described herein.

Figure 10:
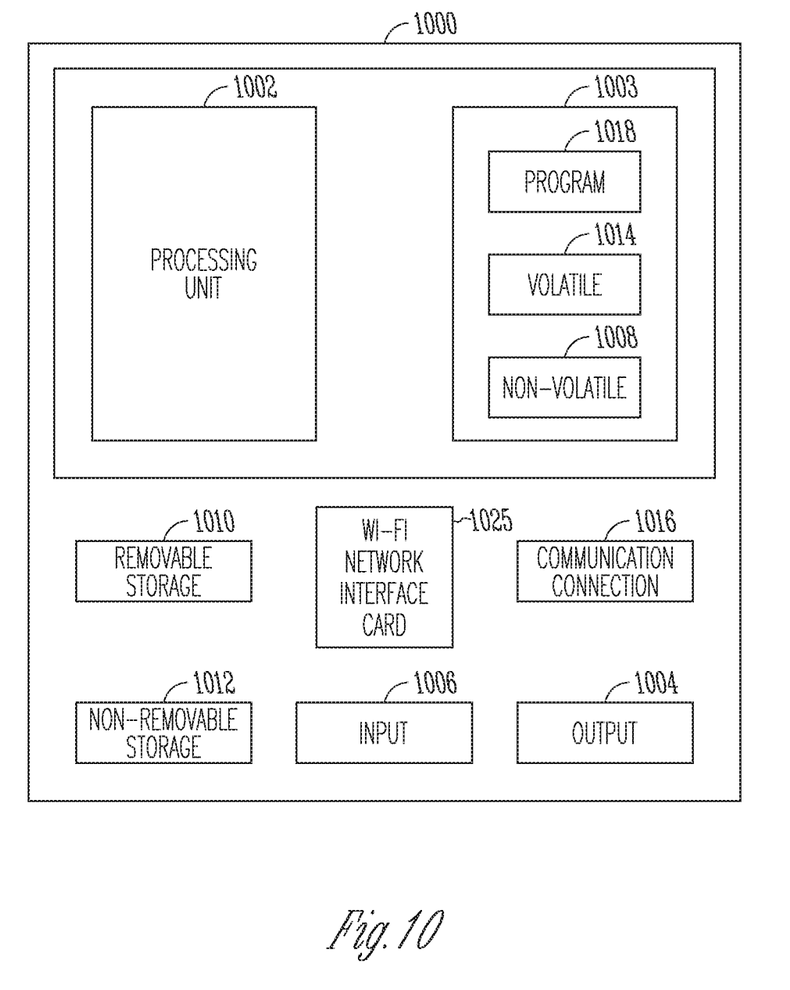
FIG. 10 is a block schematic diagram of a computer system that may be used to implement the systems and methods described herein.

FIG. 10 is a block schematic diagram of a computer system 1000 to implement methods according to example embodiments. All components need not be used in various embodiments. One example computing device in the form of a computer 1000, may include a processing unit 1002, memory 1003, removable storage 1010, and non-removable storage 1012. Although the example computing device is illustrated and described as computer 1000, the computing device may be in different forms in different embodiments. For example, the computing device may instead be a smartphone, a tablet, smartwatch, or other computing device including the same or similar elements as illustrated and described with regard to FIG. 10. Devices such as smartphones, tablets, and smartwatches are generally collectively referred to as mobile devices. Further, although the various data storage elements are illustrated as part of the computer 1000, the storage may also or alternatively include cloud-based storage accessible via a network, such as the Internet.

Memory 1003 may include volatile memory 1014 and non-volatile memory 1008. Computer 1000 may include— or have access to a computing environment that includes—a variety of computer-readable media, such as volatile memory 1014 and non-volatile memory 10010, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1000 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the computer 1000, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, Wi-Fi, Bluetooth, or other networks.

Computer-readable instructions stored on a computer-readable medium are executable by the processing unit 1002 of the computer 1000. A hard drive, CD-ROM, and RAM are some examples of articles including a non-transitory computer-readable medium such as a storage device. The terms computer-readable medium and storage device do not include carrier waves. For example, a computer program 10110 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1000 to provide generic access controls in a COM based computer network system having multiple users and servers.

EXAMPLES

In example 1, a system of saving battery power in a battery powered Wi-Fi device. The system includes a battery powered Wi-Fi device configured to transmit a customized beacon frame from the battery powered Wi-Fi device to a Wi-Fi enabled device. The customized beacon frame includes battery status information.

2. The system of claim 1 further comprising a remote server that forms at least part of the wireless network with the battery powered Wi-Fi device, wherein the customized beacon frame is transmitted from the battery powered Wi-Fi device to the remote server.

3. The system of claim 1 further comprising at least one additional Wi-Fi device that forms at least part of the wireless network with the battery powered Wi-Fi device, wherein the customized beacon frame is transmitted from the battery powered Wi-Fi device to at least one additional battery powered Wi-Fi device.

4. The system of claim 1 wherein the customized beacon frame includes battery status information in a frame body of the customized beacon frame.

5. The system of claim 4 wherein the battery status information in the frame body includes an extra seven bytes of battery status information embedded to the frame body.

6. The system of claim 5 wherein the extra seven bytes of battery status information that is embedded to the frame body of the customized beacon frame includes battery status information in a Vendor Specific Information Element Field of the customized beacon frame.

7. In example 7, a method of saving battery power in a battery powered Wi-Fi device. The method includes transmitting a customized beacon frame from the battery powered Wi-Fi device to a Wi-Fi enabled device. The customized beacon frame includes battery status information.

8. The method of claim 7 wherein transmitting a customized beacon frame from the battery powered Wi-Fi device to a Wi-Fi enabled device includes transmitting the customized beacon frame to a remote server through the Wi-Fi enabled device.

9. The method of claim 7 wherein transmitting a customized beacon frame from the battery powered Wi-Fi device to a Wi-Fi enabled device includes transmitting the customized beacon frame to another battery powered Wi-Fi device.

10. The method of claim 7 wherein transmitting a customized beacon frame includes transmitting the battery status information in a frame body of the customized beacon frame.

11. The method of claim 10 wherein transmitting the battery status information in a frame body of the customized beacon frame includes appending an extra seven bytes of battery status information to the frame body of the customized beacon frame.

12. The method of claim 11 wherein appending an extra seven bytes of battery status information to the frame body includes placing battery status information in the Vendor Specific Information Element Field of the customized beacon frame.

In example 13, a system for saving sensor battery power. The system includes battery powered sensor configured to transmit a customized beacon frame from the battery powered sensor to a Wi-Fi enabled device. The customized beacon frame includes sensor data.

14. The system of claim 13 further comprising a remote server that forms at least part of the wireless network with the battery powered sensor, wherein the customized beacon frame is transmitted from the battery powered sensor to the remote server.

15. The system of claim 13 further comprising system of claim 13 further comprising at least one additional battery powered sensor that forms at least part of the wireless network with the battery powered sensor, wherein the customized beacon frame is transmitted from the at least one additional battery powered sensor to the Wi-Fi enabled device.

16. The system of claim 13 wherein the customized beacon frame includes sensor data in a frame body of the customized beacon frame, wherein the sensor data in the frame body includes an extra seven bytes of sensor data that is embedded to the frame body in a Vendor Specific Information Element Field of the customized beacon frame.

In example 17, a method of saving battery power in a battery powered sensor, the method comprising transmitting a customized beacon frame from the battery powered sensor to a Wi-Fi enabled device. The customized beacon frame includes sensor data.

18. The method of claim 17 wherein transmitting a customized beacon frame from the battery powered sensor to a Wi-Fi enabled device includes transmitting the customized beacon frame to at least one of a remote server and another battery powered sensor.

19. The method of claim 17 wherein transmitting a customized beacon frame includes transmitting sensor data in a frame body of the customized beacon frame, wherein transmitting the sensor data in the frame body includes appending an extra seven bytes of sensor data to the frame body in a Vendor Specific Information Element Field of the customized beacon frame 20. The method of claim 17 wherein transmitting sensor data includes transmitting temperature data obtained by the sensor.

Although a few forms have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system for saving sensor battery power, the system comprising:
a battery powered sensor that collects sensor data related to the ambient environmental conditions where the battery powered sensor is located, the battery powered sensor transmitting a customized beacon frame from the battery powered sensor to a Wi-Fi enabled device, wherein the customized beacon frame includes the sensor data and a battery status information regarding a battery that powers the battery powered sensor, wherein the battery status information is embedded into a frame body of the customized beacon frame,
wherein the customized beacon frame includes the sensor data in the frame body of the customized beacon frame, wherein the sensor data in the frame body is embedded to the frame body in seven bytes for a Vendor Specific Information Element Field of the customized beacon frame, and
wherein the Vendor Specific Information Element Field includes one byte for tag identification for vendor, one byte for length information, three bytes for vendor name, one byte for information for type of sensor data, and one byte for the sensor data.

2. The system of claim 1 further comprising a remote server that forms at least part of the wireless network with the Wi-Fi device, wherein the customized beacon frame is transmitted from the battery powered sensor to the remote server.

3. The system of claim 1 further comprising at least one additional battery powered sensor that forms at least part of the wireless network with the battery powered sensor, wherein the customized beacon frame is transmitted from the at least one additional battery powered sensor to the Wi-Fi enabled device.

4. A method of saving battery power in a battery powered sensor that collects sensor data related to the ambient environmental conditions where the battery powered sensor is located, the method comprising transmitting a customized beacon frame from the battery powered sensor to a Wi-Fi enabled device, wherein the customized beacon frame includes the sensor data and a battery status information regarding a battery that powers the battery powered sensor, wherein the battery status information is embedded into a frame body of the customized beacon frame, wherein the customized beacon frame includes the sensor data in the frame body of the customized beacon frame, wherein the sensor data in the frame body is embedded to the frame body in seven bytes for a Vendor Specific Information Element Field of the customized beacon frame, and wherein the Vendor Specific Information Element Field includes one byte for tag identification for vendor, one byte for length information, three bytes for vendor name, one byte for information for type of sensor data, and one byte for the sensor data.

5. The method of claim 4 wherein transmitting a customized beacon frame from the battery powered sensor to a Wi-Fi enabled device includes transmitting the customized beacon frame to at least one of a remote server and another battery powered sensor.

6. The method of claim 4 wherein the sensor data included in the customized beacon frame comprises ambient temperature data obtained by the battery powered sensor.

* * * * *